(12) United States Patent
Oosaki

(10) Patent No.: US 9,487,638 B2
(45) Date of Patent: Nov. 8, 2016

(54) INORGANIC FILM AND MULTILAYER STRUCTURE

(71) Applicant: Sumitomo Chemical Company, Limited, Tokyo (JP)

(72) Inventor: Nobuhiro Oosaki, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/322,299

(22) Filed: Jul. 2, 2014

(65) Prior Publication Data
US 2016/0002485 A1 Jan. 7, 2016

(51) Int. Cl.
*C08K 3/34* (2006.01)
*C09D 183/06* (2006.01)
*C09D 133/02* (2006.01)

(52) U.S. Cl.
CPC ............. *C08K 3/346* (2013.01); *C09D 133/02* (2013.01); *C09D 183/06* (2013.01); *C08K 2201/008* (2013.01)

(58) Field of Classification Search
CPC ..................................................... C08K 3/346
USPC ................................................ 524/445–447
See application file for complete search history.

(56) References Cited

U.S. PATENT DOCUMENTS

2012/0046405 A1* 2/2012 Feeney et al. ................ 524/447

FOREIGN PATENT DOCUMENTS

| JP | H03-30944 A | 2/1991 |
| JP | H10-77416 A | 3/1998 |
| JP | 2003-147276 A | 5/2003 |
| JP | 2003-231789 A | 8/2003 |
| JP | 2004-050410 A | 2/2004 |

OTHER PUBLICATIONS

Nanocor Technical Data sheet; Lit. G-105 (2006).*

* cited by examiner

*Primary Examiner* — Edward Cain
(74) *Attorney, Agent, or Firm* — Panitch Schwarze Belisario & Nadel LLP

(57) ABSTRACT

Disclosed is an inorganic film comprising an inorganic laminar compound and a resin, characterized in that when an image observed with a transmission electron microscope of a cross section of the inorganic film including the thickness direction of the film is subjected to image processing to classify into 256 levels of shade on the gray scale, and subsequently, at each of arbitrary five or more points of the image-processed observed image, a straight line is drawn parallel with the thickness direction of the inorganic film from one surface of the inorganic film to the other surface, and then linear analysis is performed along each of the straight lines, the average value of standard deviations of degrees relative to the degree of each shade determined from the results of the linear analysis is 15 or less.

3 Claims, No Drawings

INORGANIC FILM AND MULTILAYER STRUCTURE

BACKGROUND OF THE INVENTION

1. Field of the Invention

The present invention relates to an inorganic film and a multilayer structure.

2. Description of the Related Art

Moldings made of thermoplastic resin such as polypropylene, polyester and polyamide have heretofore been used as packaging materials in such fields as the food field, the cosmetic field, the agrochemicals field, and the medical field. In use of a thermoplastic resin molded article as packaging material, the molded article is often required to have gas barrier properties in order to prevent the content from being degraded by oxygen. In, for example, Patent Document 1 is disclosed as a gas barrier packaging material a multilayer film produced by applying a dispersion comprising a polyvinyl alcohol, synthetic hectorite, which is an inorganic laminar compound, and water onto a base film and then drying it.

PRIOR ART DOCUMENTS

Patent Document

Patent Document 1: JP-A-03-30944

BRIEF SUMMARY OF THE INVENTION

However, the above-mentioned film is sometimes insufficient in gas barrier properties under highly humid conditions.

The present invention provides an inorganic film and a multilayer structure that are excellent in gas barrier properties under highly humid conditions.

Specifically, the present invention is an inorganic film comprising an inorganic laminar compound and a resin, characterized in that when an image observed with a transmission electron microscope of a cross section of the inorganic film including the thickness direction of the film is subjected to image processing to classify into 256 levels of shade on the gray scale, and subsequently, at each of arbitrary five or more points of the image-processed observed image, a straight line is drawn parallel with the thickness direction of the inorganic film from one surface of the inorganic film to the other surface, and then linear analysis is performed along each of the straight lines, the average value of standard deviations of degrees relative to the degree of each shade determined from the results of the linear analysis is 15 or less.

The inorganic film and the multilayer structure of the present invention are excellent in gas barrier properties under highly humid conditions.

DETAILED DESCRIPTION OF THE INVENTION

[Inorganic Laminar Compound]

The inorganic film of the present invention comprises an inorganic laminar compound and a resin. A clay mineral having swellability and cleavability in a solvent is used preferably as the inorganic laminar compound. The inorganic laminar compound as used herein refers to a substance in which unit crystal layers are superimposed one on another and form a lamellar structure. The "layered structure" referred to herein means a structure such that planes in which atoms bonding strongly to each other through covalent bonds or the like are arranged densely are stacked approximately parallel to each other by weak bonding force such as Van der Waals force. Among inorganic laminar compounds, clay minerals having swellability in a solvent are preferably used.

The clay minerals may be classified into two types, i.e., (i) a type having a two-layer structure, which comprises a silica tetrahedral layer, and an octahedral layer disposed thereon and comprising a central metal such as aluminum and magnesium; and (ii) a type having a three-layer structure, which comprises an octahedral layer comprising a central metal such as aluminum and magnesium, and a silica tetrahedral layer disposed on the both sides of the octahedral layer so as to sandwich the octahedral layer. Examples of (i) two-layer structure type of clay minerals include clay minerals of the kaolinite group and clay minerals of the antigorite group. Examples of (ii) three-layer structure type of clay minerals include clay minerals of the smectite group, vermiculite group and mica group, which are classified depending on the number of interlayer cation(s).

Examples of such clay minerals include kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophylite, and chlorite. Clay minerals whose dispersibility or the like has been improved through treatment, e.g. ion exchange, with an organizing agent (see "Dictionary of Clay" published by Asakura Shoten; hereinafter referred to as "organically modified clay mineral") are also available as inorganic laminar compounds. Examples of the organizing agent for treating clay materials include quaternary ammonium salts such as known dimethyl distearyl ammonium salt and trimethyl stearyl ammonium salt, phosphonium salts, and imidazolium salts.

Among the above-mentioned clay minerals, clay minerals of the smectite group, vermiculite group and mica group are preferred and those of the smectite group are particularly preferred. Examples of the smectite group clay minerals include montmorillonite, beidellite, nontronite, saponite, sauconite, stevensite and hectorite. In particular, montmorillonite is preferably used.

The above-described inorganic laminar compounds may be used singly and also may be used in combination.

From the viewpoint of improvement in gas barrier properties, the aspect ratio of the inorganic laminar compound is preferably 20 or more, more preferably 100 or more, even more preferably 200 or more. From the viewpoint of ease in swelling and cleaving and well improvement in gas barrier properties, the aspect ratio of the inorganic laminar compound is preferably 10000 or less, more preferably 5000 or less, even more preferably 3000 or less. The aspect ratio of an inorganic laminar compound is a value exhibited in an inorganic laminar compound dispersion containing the inorganic laminar compound and a liquid medium for swelling and cleaving the inorganic laminar compound therein.

From the viewpoint of improvement in gas barrier properties, transparency, and film forming property, the inorganic laminar compound preferably has an average particle diameter of 10 μm or less. Especially in applications requiring transparency, the average particle diameter is preferably 1 μm or less.

In the present invention, the aspect ratio (Z) of an inorganic laminar compound is defined by a formula $Z=L/a$. In the formula, "L" is the average particle diameter of the inorganic laminar compound and "a" is the unit thickness of the inorganic laminar compound, namely, the thickness of unit crystal layers of the inorganic laminar compound, which is determined by the powder x-ray diffraction method (see "Guide to Instrumental Analysis (a)" p. 69, edited by Jiro Shiokawa, published by Kagaku-Dojin Publishing Company, Inc. (1985)).

The average particle diameter of an inorganic laminar compound is the particle diameter determined by the diffraction/scattering method carried out in liquid medium, namely, a median diameter based on volume. Specifically, the average particle diameter is determined, by the Mie scattering theory, through calculation of a particle size distribution most consistent to a diffraction/scattering pattern obtained by passing a beam of light through a dispersion liquid of an inorganic laminar compound. More specifically, a method is available which comprises dividing the measurement range of the particle size distribution into proper sections, determining a representative particle diameter for each of the sections, and then calculating a particle size distribution by converting the particle size distribution, which is continuous by nature, into discrete quantities.

Specifically, the inorganic laminar compound is preferably one that exhibits a swelling value of 5 or more in the swellability test described below, more preferably one that exhibits a swelling value of 20 or more. In addition, one that exhibits a cleavage value of 5 or more in the cleavability test described below is preferred, and one that exhibits a cleavage value of 20 or more is more preferred.

[Swellability Test]

In a 100-ml graduated cylinder is placed 100 ml of liquid medium, and 2 g of an inorganic layer compound is added thereto. After standing at 23° C. for 24 hours, the volume in milliliter of the inorganic layer compound dispersion layer in the graduated cylinder is read from the graduation at the interface between the inorganic layer compound dispersion layer and the supernatant liquid. The larger the value (swell value), the higher the swellability.

[Cleavability Test]

Thirty grams of an inorganic laminar compound is added slowly to 1500 mL of liquid medium, and is dispersed by means of a disperser (DESPA MH-L manufactured by Asada Iron Works Co., Ltd.; vane diameter=52 mm, rotating speed=3100 rpm, container capacity=3 L, distance between the bottom face and the vane=28 mm) with a peripheral speed of 8.5 m/sec at 23° C. for 90 minutes. Thereafter, 100 mL of the resultant dispersion is taken out and placed into a graduated cylinder. After standing for 60 minutes, the volume in milliliter of the inorganic layer compound dispersion layer in the graduated cylinder is read from the graduation at the interface between the inorganic layer compound dispersion layer and the supernatant liquid. The larger the value (cleavage value), the higher the cleavability.

Inorganic laminar compounds usually have cations between layers. Although the cations are usually sodium ions, the inorganic laminar compound of the present invention is preferably one that contains one or more kinds of ions selected from the group consisting of hydrogen ion, ammonium ion, and lithium ion between the layers thereof.

The sodium ion concentration in the inorganic laminar compound is preferably 400 µmol/g or less, more preferably 300 µmol/g or less, even more preferably 100 µmol/g or less per 1 g of the inorganic laminar compound.

The total concentration of hydrogen ion, ammonium ion and lithium ion in the inorganic laminar compound is preferably 400 µmol/g or more, more preferably 500 µmol/g or more, even more preferably 600 µmol/g or more per 1 g of the inorganic laminar compound.

From the viewpoint that the gas barrier properties under highly humid conditions of the resulting inorganic film are more improved, it is more preferred that the sodium ion concentration satisfy the above-described condition and the total concentration of hydrogen ion, ammonium ion and lithium ion satisfy the above-described condition.

The inorganic laminar compound containing one or more kinds of ions selected from the group consisting of hydrogen ion, ammonium ion, and lithium ion between the layers thereof is obtained by exchanging sodium ions contained between the layers of the inorganic laminar compound for one or more kinds of ions selected from the group consisting of hydrogen ion, ammonium ion, and lithium ion. The cation concentration between the layers of the inorganic laminar compound can also be controlled by performing ion exchange treatment. Examples of the ion exchange treatment include a method in which an ion exchange resin having one or more kinds of ions selected from the group consisting of hydrogen ion, ammonium ion, and lithium ion is brought into contact with a dispersion comprising an inorganic laminar compound whose cations located between layers are sodium ions and a liquid medium, and then the residue of the ion exchange resin is removed, and a method in which a dispersion comprising an inorganic laminar compound whose cations located between layers are sodium ions and a liquid medium is brought into contact with a liquid containing one or more kinds of ions selected from the group consisting of hydrogen ion, ammonium ion, and lithium ion through a semipermeable membrane and ion exchange is performed utilizing pressure difference or electrodialysis. The dispersion in the case of performing the ion exchange treatment may contain the resin described below.

As to the method for determining qualitatively and quantitatively a cation contained in an inorganic laminar compound, when the cation is a metal ion such as a sodium ion and a lithium ion, measurement is carried out using an inductively coupled plasma-atomic emission spectroscopic analyzer. The metal ion concentration such as the sodium concentration and the lithium concentration measured using the inductively coupled plasma-atomic emission spectroscopic analyzer are taken as the sodium ion concentration and the lithium ion concentration, respectively. When the cation is a nonmetal ion such as ammonium ion, it can be determined by capillary electrophoresis. As to hydrogen ion, it can be determined according to the difference between the cation concentration in the inorganic laminar compound before the below-described ion exchange and the cation concentration in the inorganic laminar compound after the ion exchange. When a dispersion containing an inorganic laminar compound is available, the respective ion concentrations can be measured using a sample obtained by removing a liquid medium from the inorganic laminar compound dispersion. As to the method for determining qualitatively and quantitatively a cation contained in an inorganic film, ion concentrations can be determined by, for example, a method in which respective ion concentrations in the entire inorganic film are measured and then the concentration of the cation contained in the resin is subtracted from the respective ion concentrations.

[Resin]

The resin contained in the inorganic film of the present invention is preferably a resin that gives an oxygen transmission rate of 1000 cc/m$^2$·day·atm or less as measured under conditions of 23° C. and 0% RH using a 25-µm thick film made of only the resin from the viewpoint of enhancing the gas barrier properties of the inorganic film and the multilayer structure described below. When it is difficult to form a film composed only of the resin, a layer of the resin whose oxygen transmission rate is intended to be measured is formed on a substrate film composed of another resin with known oxygen transmission rate. Thus, a laminate film is formed. This laminate film is then measured for its oxygen transmission rate. The oxygen transmission rate of the resin layer formed on the substrate film is calculated using the following equation:

$$1/P=(1/P1)+(1/P2)$$

P: oxygen transmission rate of a laminated film (cc/m²·day·atm)

P1: oxygen transmission rate of a substrate film (cc/m²·day·atm)

P2: oxygen transmission rate of a resin layer (cc/m²·day·atm).

Specifically, a 25-μm thick PET film is used as the substrate film. On the substrate film, a layer of the resin whose oxygen transmission rate is intended to be measured is formed and its oxygen transmission rate is measured. Thus, the oxygen transmission rate per 25-μm thick resin layer is calculated.

Examples of the resin that gives an oxygen transmission rate of 1000 cc/m²·day·atm or less as measured under conditions of 23° C. and 0% RH using a 25-μm thick film made of only the resin include polyvinyl alcohol (PVA), ethylene-vinyl alcohol copolymers (EVOH), polysaccharides, imide resin, amide resin, ester resin, polyvinylidene chloride (PVDC), polyacrylonitrile (PAN), polyacrylic acid and esters thereof, polymethacrylic acid and esters thereof, the below-described resin having two or more kinds of functional groups, and a resin resulting from a reaction of the below-described thermally reactive composition.

The "polyvinyl alcohol" used herein refers to a polymer predominantly comprising a monomer unit of vinylalcohol. Specific examples of such "polyvinyl alcohol" include a polymer obtained by hydrolyzing acetic acid portions of a vinyl acetate polymer (exactly, a copolymer of vinyl alcohol and vinyl acetate), and polymers obtained by hydrolyzing a polymer such as vinyl trifluoroacetate polymer, vinyl formate polymer, vinyl pivalate polymer, t-butyl vinyl ether polymer, and trimethylsilyl vinyl ether polymer. Regarding the details of the "polyvinyl alcohol", a book entitled "The World of PVA" edited by POVAL Society (1992), published by Polymer Publishing Association; and a book entitled "POVAL" written by Nagano et al. (1981), published by Polymer Publishing Association may be referred to. The degree of "saponification" of the polyvinyl alcohol is 70 mole % or more, more preferably 85 mole % or more. Particularly preferred is a product with a degree of saponification of 98 mole % or more, namely, so-called "completely saponified polyvinyl alcohol". The degree of polymerization is preferably from 100 to 5000, more preferably from 200 to 3000.

Moreover, a so-called polyvinyl alcohol derivative, which has a functional group other than a hydroxyl group, also can be used as a polyvinyl alcohol, and examples of the functional group other than a hydroxyl group include an amino group, a thiol group, a carboxyl group, a sulfone group, a phosphoric acid group, a carboxylate group, a sulfonic acid ion group, a phosphate ion group, an ammonium group, a phosphonium group, a silyl group, a siloxane group, an alkyl group, an allyl group, a fluoroalkyl group, an alkoxy group, a carbonyl group, and a halogen group. Some hydroxyl groups in PVA may have been replaced by one or more kinds of functional groups.

The polysaccharide used herein refers to biopolymers which are synthesized by polycondensation of various monosaccharides in organisms and include chemically modified polysaccharides. Specific examples thereof include cellulose, cellulose derivatives such as hydroxymethylcellulose, hydroxyethylcellulose, and carboxymethylcellulose; and amylose, amylopectin, pullulan, curdlan, xanthan, chitin and chitosan.

The imide resin is a resin having imide bonds in repeating units contained in its molecule and refers to an aromatic polyimide composed of aromatic compounds linked directly together via imide bonds and specifically is a resin obtained by subjecting a polyamic acid to dehydrative cyclization reaction.

The amide resin is a resin having amide bonds in repeating units contained in its molecule and examples thereof include an aliphatic polyamide having an aliphatic skeleton or an aromatic polyamide having an aromatic skeleton.

Examples of the aliphatic polyamide include a polycondensate of ε-caprolactam and a copolycondensate of hexamethylenediamine and adipic acid. Examples of the aromatic polyamide include a copolycondensate of p-phenylenediamine and terephthaloyl chloride and a copolycondensate of m-phenylenediamine and isophthaloyl chloride.

The resin containing two or more kinds of functional groups may be either a resin containing two or more kinds of functional groups in one molecule or a mixture of a resin containing a first functional group and a resin containing a second functional group.

The functional groups contained in the resin containing two or more kinds of functional groups are two or more kinds of functional groups selected from the group consisting of a hydroxyl group, a carboxyl group, an amino group, a sulfonic acid group, a carboxylate group, and an ammonium group, and that resin is a resin in which the functional groups thereof are capable of forming a covalent-bonding or ion-bonding bond.

Examples of the resin containing two or more kinds of functional groups in one molecule include copolymers such as vinyl alcohol-acrylic acid copolymers, vinyl alcohol-methacrylate copolymers, vinyl alcohol-vinylamine copolymers, acrylic acid-vinylamine copolymers, and methacrylic acid-vinylamine copolymers, and resins having functional groups selected from the group consisting of a carboxyl group, an amino group, a sulfonic acid group, a carboxylate group, and an ammonium group among the above-mentioned polyvinyl alcohol derivatives and polysaccharides.

When the resin containing two or more kinds of functional groups is a mixture of a resin containing a first functional group and a resin containing a second functional group, examples thereof include combinations of two or more selected from among polyvinyl alcohol, partially saponified polyvinyl alcohol, polysaccharides, polyacrylic acid, polymethacrylic acid, partially neutralized polyacrylic acid, partially neutralized polymethacrylic acid, polyvinylamine, and so on.

From the viewpoints of capability of being dissolved easily in a water-based liquid medium, easiness in handling, and gas barrier properties of an inorganic film or a multilayer structure, the resin containing two or more kinds of functional groups is preferably a resin containing a hydroxyl group and a carboxyl group as the functional groups. In the case of a resin containing a hydroxyl group and a carboxyl group in each molecule, a vinyl alcohol-acrylic acid copolymer and a vinyl alcohol-methacrylic acid copolymer are preferred. In the case of a mixture of a resin containing a hydroxyl group and a resin containing a carboxyl group, it is preferable that the resin containing a hydroxyl group be a polyvinyl alcohol and the resin containing a carboxyl group be a polyacrylic acid, a polymethacrylic acid, a partially neutralized polyacrylic acid, or a partially neutralized polymethacrylic acid.

Preferably, the resin containing carboxyl groups is one or more resins selected from among polyacrylic acid, polymethacrylic acid, partially neutralized polyacrylic acid, and partially neutralized polymethacrylic acid. Copolymers of acrylic acid and methacrylic acid can also be used. The average molecular weight of the resin containing carboxyl groups is preferably within the range of 2000 to 1000000, more preferably 100000 to 1000000.

The partially neutralized polyacrylic acid or the partially neutralized polymethacrylic acid can be obtained usually by adding an alkali to an aqueous solution of a polyacrylic acid or a polymethacrylic acid.

A desired degree of neutralization can be obtained by adjusting the quantitative ratio of the polyacrylic acid or the polymethacrylic acid and the alkali. In terms of gas barrier properties and transparency, the partially neutralized polyacrylic acid and the partially neutralized polymethacrylic acid preferably have a degree of neutralization, calculated from the following formula, of 0.1% to 20%.

Degree of neutralization=$(A/B) \times 100$

A: the total number of moles of the neutralized carboxyl groups contained in 1 g of polyacrylic acid or polymethacrylic acid B: the total number of moles of the unneutralized carboxyl groups contained in 1 g of polyacrylic acid or polymethacrylic acid The molar ratio of the hydroxyl groups and the carboxyl groups in the resin containing hydroxyl groups and carboxyl groups is preferably hydroxyl group:carboxyl group=30:70 to 95:5, more preferably 70:30 to 95:5. In order to form an inorganic film or a multilayer structure which is excellent especially in gas barrier properties under highly humid conditions, the total weight of the hydroxyl groups and the carboxyl groups contained in the resin is preferably 30 to 60%, more preferably 35 to 55%. The total weight of the hydroxyl groups and the carboxyl groups is a value calculated when the weight of the resin is taken as 100% by weight.

The molar ratio of hydroxyl groups and carboxyl groups in the resin containing hydroxyl groups and carboxyl groups can be determined by a publicly known method such as an NMR method and an IR method. For example, in the IR method, the molar ratio can be calculated by producing a calibration curve using samples having known molar ratios of hydroxyl groups to carboxyl groups.

When using a vinyl alcohol homopolymer and an acrylic acid homopolymer and/or a methacrylic acid homopolymer, the number of moles of hydroxyl groups and carboxyl groups are determined beforehand from their weight and then the molar ratio can be calculated. The total weight of the hydroxyl groups and the carboxyl groups contained in the resin can be determined by a publicly known method such as an NMR method and an IR method like the molar ratio. For example, in the IR method, the total weight can be calculated by producing a calibration curve for polyol polymers having known number of polyol units and polycarboxylic acid polymers having known numbers of polycarboxylic acid units. When using a vinyl alcohol homopolymer and an acrylic acid homopolymer and/or a methacrylic acid homopolymer, the weights of hydroxyl groups and carboxyl groups are determined beforehand from the weights of the polymers, and then the total thereof can be used.

When the resin is a resin containing a hydroxyl group and a carboxyl group, the resin preferably contains an alkali metal ion in terms of the water resistance of the inorganic film and the multilayer structure of the present invention. Examples of the alkali metal ion include sodium ion, lithium ion, and potassium ion. When the weight of the resin is taken as 100%, the content of the ion is preferably 2000 to 50000 ppm, more preferably 2000 to 20000 ppm.

The alkali metal ion derives from an alkali metal ion donating compound. When the resin is a resin containing a hydroxyl group and a carboxyl group, the resin preferably contains an alkali metal ion-donating compound. Examples of the alkali metal ion-donating compound include sodium hydroxide, sodium hypophosphite, lithium hydroxide, and potassium hydroxide. When montmorillonite is used as an inorganic laminar compound, the montmorillonite acts as an alkali metal ion-donating compound because sodium ions are contained between layers of the montmorillonite. Therefore, use of montmorillonite as an inorganic laminar compound is particularly preferred. Two or more alkali metal ion-donating compounds may be used in combination.

The resin of the present invention may be a resin resulting from the reaction of a thermally reactive composition. The thermally reactive composition is a substance having a relatively low molecular weight that is liquid, semi-solid or solid at normal temperature and exhibits fluidity at normal temperature or elevated temperature, and it is a composition capable of forming a three-dimensional network structure while undergoing a curing reaction or a crosslinking reaction on heating treatment and increasing its molecular weight. Preferably, the thermally reactive composition to be used in the present invention is one that is soluble in a solvent before being subjected to the heating treatment described below and that affords, via the heating treatment, an inorganic film insoluble in the solvent.

Examples of the thermally reactive composition include a composition comprising two or more kinds of monomers that react with each other and a composition comprising a monomer that polymerizes on heating to form a polymer and a polymerization initiator.

Examples of the composition comprising two or more kinds of monomers that react with each other include a composition comprising a monomer containing a hydroxyl group and a monomer containing a carboxyl group and a composition comprising a monomer containing a hydroxyl group and a monomer containing an isocyanate group. The composition comprising a monomer containing a hydroxyl group and a monomer containing an isocyanate group may be a urethane resin.

Examples of the monomer that polymerizes on heating to form a polymer include epoxy compounds, (meth)acryloyl compounds, allyl compounds, and vinyl compounds.

Preferably, the thermally reactive composition is a composition comprising an epoxy compound and a polymerization initiator or a composition comprising a monomer containing a hydroxyl group and a monomer containing a carboxyl group.

The above-mentioned epoxy compound refers to a compound having at least one epoxy group. The number of epoxy groups in the epoxy compound is preferably one group or more per molecule, more preferably two groups or more per molecule. The number of epoxy groups per molecule can be determined by dividing the total number of the epoxy groups in the epoxy compound by the total number of molecules of the epoxy compound.

A publicly known compound having an epoxy group can be used as the epoxy compound and examples thereof include bisphenol type epoxy compounds, novolac type epoxy compounds, glycidyl ester type epoxy compounds, glycidyl amine type epoxy compounds, and fluorene type epoxy compounds; an epoxy compound having an aromatic ring in the molecule thereof is preferred. An epoxy compound having a siloxane bond, such as a silsesquioxane unit, in the molecule thereof also can be used. The thermally reactive composition may contain two or more kinds of epoxy compounds.

Examples of the polymerization initiator for epoxy compounds include amines such as bis(4-aminocyclohexyl), methanediaminodiphenyl sulfone, 1,5-azabicyclo(4,3,0)-nonene-7, and their salts; acid anhydrides such as phthalic and dodecenylsuccinic anhydride; polyhydric phenols such as bisphenol F and phenol novolac; imidazoles such as 2-methylimidazole and 2-ethyl-4-methylimidazole; BF3 complex compounds of the above-mentioned amines; Brönsted acid salts such as aromatic sulfonium salts, iodonium salts, and phosphonium salts; organic acid hydrazides such as adipic acid dihydrazide and phthalic acid dihydrazide; dicyandiamides; and polycarboxylic acids such as adipic acid, sebacic acid, terephthalic acid, trimellitic acid, and carboxyl group-containing polyesters. In terms of the rate of reaction, it is preferred to use an ionic thermally latent cationic polymerization initiator such as benzylsulfonium salts, benzylammonium salts, benzylpyridinium salts, and benzylphosphonium salts containing hexafluoroantimony, hexafluorophosphorus, tetrafluoroboron, etc. as counter anions; or a nonionic thermally latent cationic polymerization initiator such as N-benzylphthalimide and aromatic sulfonic acid esters. Preferably, the polymerization initiator has a polyimide skeleton in its molecule. The polyimide skeleton as referred to herein is a structure in which aromatic compounds are linked directly via an imide bond. Two or more polymerization initiators may be used.

Examples of the composition comprising a monomer containing a hydroxyl group and a monomer containing a carboxyl group include a composition comprising an aromatic alcohol and an aromatic carboxylic acid.

Specifically, a combination of an aromatic hydroxycarboxylic acid, an aromatic dicarboxylic acid, and an aromatic diol, a combination of two or more aromatic hydroxycarboxylic acids, an aromatic dicarboxylic acid, and an aromatic diol, such combinations in which some of the aromatic hydroxycarboxylic acid is replaced by an aromatic aminocarboxylic acid, such combinations in which some of the aromatic diol is replaced by an aromatic amine having a phenolic hydroxyl group and/or an aromatic diamine can be used; in view of ease in handling, such as solubility in a solvent, (1) an aromatic hydroxycarboxylic acid, (2) an aromatic dicarboxylic acid, and (3) an aromatic diamine, an aromatic amine having a hydroxyl group or an aromatic amino acid are preferably contained.

Examples of the aromatic hydroxycarboxylic acid represented by the above (1) include p-hydroxybenzoic acid, 2-hydroxy-6-naphthoic acid, and 4-hydroxy-4'-biphenylcarboxylic acid; 2-hydroxy-6-naphthoic acid is preferably contained. Two or more of these may be used.

Examples of the aromatic dicarboxylic acid represented by the above (2) include terephthalic acid, isophthalic acid, and 2,6-naphthalenedicarboxylic acid; isophthalic acid is preferably contained. Two or more of these may be used.

Examples of the aromatic diamine, the aromatic amine having a hydroxyl group, or the aromatic amino acid represented by the above (3) include 3-aminophenol, 4-aminophenol, 1,4-phenylenediamine, 1,3-phenylenediamine, and aminobenzoic acid; 4-aminophenol is preferably contained. Two or more of these may be used.

Ester-forming derivatives of the above (1) to (3) also may be used. Examples of the ester-forming derivatives of carboxylic acids include those in which a carboxyl group has been transformed into a derivative with high reaction activity, such as an acid chloride and an acid anhydride, which promotes a reaction to form a polyester, and those in which a carboxyl group has formed an ester with an alcohol that forms a polyester via a transesterification reaction or ethylene glycol. Examples of the ester-forming derivative of a phenolic hydroxyl group include those in which a phenolic hydroxyl group has formed an ester with a carboxylic acid so as to form a polyester via a transesterification reaction. Examples of the ester-forming derivative of an amino group include those in which an amino group has formed an ester with a carboxylic acid so as to form a polyester via a transesterification reaction.

When the thermally reactive composition is a composition comprising an aromatic alcohol and an aromatic carboxylic acid, a composition a part of which has been prepolymerized as long as it is soluble in the nonionic solvent described below may also be used.

Examples of the aprotic solvent include halogen-containing solvents such as 1-chlorobutane, chlorobenzene, 1,1-dichloroethane, 1,2-dichloroethane, chloroform, and 1,1,2,2-tetrachloroethane, ether solvents such as diethyl ether, tetrahydrofuran, and 1,4-dioxane, ketone solvents such as acetone and cyclohexanone, ester solvents such as ethyl acetate, lactone solvents such as γ-butyrolactone, carbonate solvents such as ethylene carbonate and propylene carbonate, amine solvents such as triethylamine and pyridine, nitrile solvents such as acetonitrile and succinonitrile, amide solvents such as N,N-dimethylformamide, N,N-dimethylacetamide, tetramethylurea, and N-methylpyrrolidone, nitro solvents such as nitromethane and nitrobenzene, sulfide solvents such as dimethyl sulfoxide and sulfolane, and phosphoric acid-based solvents such as hexamethyl phosphoramide and tri-n-butyl phosphate.

When the resin resulting from the reaction of the thermally reactive composition is a thermal reaction product of a composition comprising an aromatic alcohol and an aromatic carboxylic acid, a structural unit derived from an aromatic diamine, a structural unit derived from an aromatic amine having a hydroxyl group, a structural unit derived from an aromatic amino acid, or two or more of the foregoing structural units are contained in an amount of 10 to 35 mol % relative to all structural units. Moreover, the resin preferably comprises structural units represented by the following formulae (1) to (3) as its structural units, the structural unit represented by formula (1) accounting for 30 to 80 mol %, the structural unit represented by formula (2) accounting for 35 to 10 mol %, and the structural unit represented by formula (3) accounting for 35 to 10 mol %.

—O—Ar1-CO—            Formula (1)

—CO—Ar2-CO—          Formula (2)

—X—Ar3-Y—             Formula (3)

Ar1 represents 1,4-phenylene, 2,6-naphthalene or 4,4'-biphenylene. Ar2 represents 1,4-phenylene, 1,3-phenylene or 2,6-naphthalene. Ar3 represents 1,4-phenylene or 1,3-phenylene. X is —NH— and Y represents —O— or —NH—.

[Inorganic Film]

The inorganic film of the present invention is characterized in that when an image observed with a transmission electron microscope of a cross section of the inorganic film including the thickness direction of the film is subjected to image processing to classify into 256 levels of shade on the gray scale, and subsequently, at each of arbitrary five or more points of the image-processed observed image, a straight line is drawn parallel with the thickness direction of the inorganic film from one surface of the inorganic film to the other surface, and then linear analysis is performed along each of the straight lines, the average value of standard deviations of degrees relative to the degree of each shade determined from the results of the linear analysis is 15 or less.

The cross section observation with a transmission electron microscope is preferably carried out at a magnification that can afford an observed image in which each layer of the inorganic laminar compound can be recognized and is preferably carried out at a magnification of 100,000 or more. It is necessary to carry out the image processing and the linear analysis described below using an observed image in which the inorganic film is included 70% or more in the thickness direction of the film and it is preferred to use an observed image in which the inorganic film is included entirely in the thickness direction of the film.

The observed image is subjected to image processing by which the image is classified into 256 levels of shade on the gray scale. The gray scale is a technique to expressing an image only in shade (brightness) from white to black; in the present application, an image is classified into 256 levels of shade. Such image processing and the below-described linear analysis can be carried out using general purpose image analysis software; for example, WinROOF (registered trademark) of Mitani Corp., Adobe Photo Shop of Adobe Systems, Scion Image of Scion Corporation, Magical IP (registered trademark) of Magical Art, and Nano Hunter (registered trademark) of Nano System, etc. can be used.

Subsequently, subsequently, at each of arbitrary five or more points of the image-processed observed image, a straight line is drawn parallel with the thickness direction of the inorganic film from one surface of the inorganic film to the other surface, and then linear analysis is performed along each of the straight lines. The linear analysis is an analytical method to show, along the straight line to be analyzed, the distribution of the degree of the shade of an observed image having been subjected to image processing. In the present invention, the degree of shade is classified into 256 levels by performing image processing on the gray scale. Preferably, the linear analysis is performed so as to show, along the straight line to be analyzed, the distribution of the degree of shade at intervals of 0.1 to 1 nm.

From the result of the linear analysis can be obtained frequency distribution relative to the degree of each shade. The frequency distribution relative to the degree of each shade can be understood easily if a frequency distribution diagram is produced in which the degree of shade (brightness) is shown on the abscissa and the frequency thereof is shown on the ordinate.

It is preferred with the inorganic film of the present invention that the average value of standard deviations of degrees relative to the degree of each shade determined from the results of the linear analysis is 15 or less, more preferably 14 or less, even more preferably 13 or less. In determining the standard deviation, linear analysis is performed along each of at least five different straight lines, then standard deviation is determined for each of the analyses, and then the average value thereof is calculated. Preferably, linear analysis is performed along each of eight or more straight lines.

The average of the standard deviations determined by the above-described method is an index that indicates the orientation state of an inorganic laminar compound in an inorganic film; a smaller average of the standard deviations indicates that individual inorganic laminar compound plates in the inorganic film are present at more even intervals and more uniformly and that a larger number of inorganic laminar compound plates are oriented perpendicular to the thickness direction of the inorganic film. An inorganic film having an average of the above-described standard deviations of 15 or less is excellent in gas barrier properties under highly humid conditions.

Preferably, the content of the inorganic laminar compound contained in the inorganic film of the present invention is 5 to 95% by volume where the total volume of the inorganic laminar compound and the resin contained in the inorganic film is taken as 100% by volume. From the standpoint of the gas barrier properties of the inorganic film, the content of the inorganic laminar compound is preferably higher than 10% by volume, more preferably higher than 15% by volume. From the standpoint of the flexibility of the inorganic film, the content of the inorganic laminar compound is preferably lower than 90% by volume, more preferably lower than 80% by volume.

[Method for Producing of Inorganic Film]

Preferably, the inorganic film of the present invention is produced using a mixed liquid composed of the above-described inorganic laminar compound, a resin, and a liquid medium.

Preferably, a liquid medium capable of swelling and cleaving an inorganic laminar compound is used as the liquid medium contained in the mixed liquid.

While the liquid medium capable of swelling and cleaving an inorganic laminar compound may be water, an alcohol (methanol, ethanol, propanol, isopropanol, ethylene glycol, diethylene glycol, etc.), dimethylformamide, dimethyl sulfoxide, acetone, etc. when the inorganic laminar compound is a hydrophilic swellable clay material, especially, water, an alcohol, and a water-alcohol mixture are preferred.

When the inorganic laminar compound is an organically modified clay mineral, aromatic hydrocarbons such as benzene, toluene and xylene, ethers such as ethyl ether and tetrahydrofuran, ketones such as acetone, methyl ethyl ketone, and methyl isobutyl ketone, aliphatic hydrocarbons such as n-pentane, n-hexane, and n-octane, halogenated hydrocarbons such as chlorobenzene, carbon tetrachloride, chloroform, dichloromethane, 1,2-dichloroethane, and perchlorethylene, ethyl acetate, methyl methacrylate, dioctyl phthalate, dimethylformamide, dimethyl sulfoxide, methyl cellosolve, silicone oil, etc. can be used as a liquid medium.

Examples of the method for preparing the mixed liquid include a method comprising mixing a resin-containing liquid prepared by dissolving or dispersing the resin, etc. in the liquid medium and an inorganic laminar compound dispersion prepared by swelling and cleaving the inorganic laminar compound in the liquid medium; a method comprising mixing resin directly with an inorganic laminar compound dispersion prepared by swelling and cleaving the inorganic laminar compound in a liquid medium; and a method comprising mixing a resin-containing liquid with an inorganic laminar compound. The method comprising mixing a resin-containing liquid prepared by dissolving or dispersing the resin, etc. in the liquid medium and an inorganic laminar compound dispersion prepared by swelling and cleaving the inorganic laminar compound in a liquid medium is preferred because it is possible to disperse the fully swollen and cleaved inorganic laminar compound in the resin uniformly.

In order to obtain the inorganic film of the present invention, the above-described mixed liquid is prepared by performing high pressure dispersion treatment. A mixed liquid containing both the resin and the inorganic laminar compound may be subjected to the high pressure dispersion treatment or, alternatively, an inorganic laminar compound dispersion which has been subjected to the high pressure dispersion treatment may be mixed with the resin by using the method described above.

The high pressure dispersion treatment is performed by using a high pressure dispersing device. The high pressure dispersing device may be, for example, NANOMIZER manufactured by Nanomizer Inc. The high pressure dispersion treatment is a treatment method comprising forcing the mixed liquid or the inorganic laminar compound dispersion to pass through capillary tubes at a high speed and then combine, thereby causing the flows of the mixed liquid or the inorganic laminar compound dispersion to collide with each other or against the inner walls of the capillary tubes to apply high shear and/or high-pressure to the mixed liquid or the inorganic laminar compound dispersion. In the high pressure dispersion treatment, it is desirable to force the mixed liquid or the inorganic laminar compound dispersion to pass through capillary tubes with a diameter of about 1 μm to about 1000 μm so that a maximum pressure of 100 kgf/m$^2$ or more may be applied. The maximum pressure is more preferably 500 kgf/cm$^2$ or more, particularly preferably 1000 kgf/cm$^2$ or more.

When the mixed liquid or the inorganic laminar compound dispersion passes through the capillary tubes, the maximum speed of the dispersion is preferably 100 m/s or more and the rate of heat flow caused by pressure loss is preferably 100 kcal/hr or more.

In the case of producing an inorganic film using the above-described mixed liquid, a method is preferred in which a coating film is formed on the surface of the substrate described below using the mixed liquid, then a multilayer structure composed of the substrate and the inorganic film is formed by removing the liquid medium from the coating film, and then the substrate is removed.

Copper, fluorine-containing resin and polyolefin resin are preferred as the material that constitutes the removable substrate.

Examples of the method for forming the coating film include gravure methods such as a direct gravure method and a reverse gravure method, roll coating methods such as a two-roll beat coating method and a bottom-feed three-roll reverse coating method, a doctor knife method, a die coating method, a bar coating method, a dipping method, a spray coating method, and a spin coating method. It is preferred to adopt a gravure method, a spin coating method or a die coating method because a layer with a uniform thickness can be provided thereby. The coating film may be formed either partly or entirely on the surface of the substrate.

The temperature taken when the liquid medium is removed from the coating film is preferably 20 to 150° C., more preferably 30 to 140° C., even more preferably 40 to 130° C., most preferably 50 to 120° C. The time for the water vapor removal is usually 0.1 seconds to 24 hours. The water vapor concentration taken when the liquid medium is removed from the coating film is 0 to 50 g/m$^3$. Examples of the heat source to be used when the liquid medium is removed from the coating film include hot roll contact, heat medium contact (air, etc.), infrared heating and microwave heating.

Examples of the method for removing the substrate include a method of peeling the substrate from the inorganic film and the method of dissolving the substrate. When the substrate is made of copper, for example, the method for dissolving the substrate may be a method in which the multilayer structure composed of the copper substrate and the inorganic film is immersed in an aqueous solution of ferric chloride and then the substrate is removed by dissolving the copper.

A surfactant may be added to the mixed liquid. Forming an inorganic film by applying a mixed slip containing a surfactant makes it easy to apply the mixed slip to a substrate uniformly. The content of the surfactant is usually from 0.001 to 5% by weight on the basis of 100% by weight of the mixed slip. It is preferable that the content of the surfactant be 0.001% by weight or more because it is easy to apply the mixed slip to the substrate uniformly, and it is preferable that the content of the surfactant be 5% by weight or less because good gas barrier properties can thereby be achieved.

As the surfactant, such surfactants as anionic surfactants, cationic surfactants, amphoteric surfactants and nonionic surfactants may be used. Especially, use of an alkali metal salt of a carboxylic acid having an alkyl chain having 6 to 24 carbon atoms, an ether type nonionic surfactant (silicone-based nonionic surfactant) such as a polydimethylsiloxane-polyoxyethylene copolymer, or a fluorine type nonionic surfactant (fluorine-containing nonionic surfactant) such as a perfluoroalkyl ethylene oxide compound is preferred from the viewpoint of being easy to apply a mixed slip to a substrate uniformly.

[Multilayer Structure]

The multilayer structure of the present invention has the above-described inorganic film and an adjacent layer that is adjacent to the inorganic film. The adjacent layer is a layer that is adjacent to an inorganic film, and the multilayer structure of the present invention may be either a multilayer structure having an adjacent layer on one surface of an inorganic film or a multilayer structure having an adjacent layer on each of both surfaces of an inorganic film. In the case of the multilayer structure having an adjacent layer on each of both surfaces of an inorganic film, the two adjacent layers may be formed of either the same material or different materials.

Examples of the material that forms an adjacent layer include metal, resin, wood, ceramics, and glass.

Examples of the form of the adjacent layer include paper, cloth, nonwoven fabric, and film.

Examples of the metal include copper, iron, silver, aluminum, silica, and titanium and also include alloys thereof. When the adjacent layer is made of metal, the adjacent layer may be a layer of metal vapor-deposited on another layer. When the adjacent layer is a layer of metal vapor-deposited on another layer, the vapor-deposited metal may be aluminum, alumina, or silica.

As the resin, thermoplastic resin, thermosetting resin, photocurable resin, etc. can be used.

Examples of the thermoplastic resin include olefin-based resins, ethylene-based copolymers, ester resins, amide resins, polyarylate, acrylic resins, polystyrene, styrene-based resins, hydrophobically modified cellulose-based resins, chlorine-containing resins, fluorine-containing resins, hydrogen bonding resins, carbonate resins, sulfone resins, ether sulfone resins, ether ether ketone resins, phenylene oxide resins, methylene oxide resins, and imide resins.

Examples of the olefin-based resins include polyethylene, ethylene-α-olefin copolymers, polypropylene, polybutene-1, and poly-4-methylpentene-1.

Examples of the ethylene-based copolymers include ethylene-vinyl acetate copolymers or their saponified products, ethylene-α,β-unsaturated carboxylic acid ester copolymers, and ethylene-α,β-unsaturated carboxylic acid copolymers.

Examples of the ester resins include polyethylene terephthalate, polybutylene terephthalate, and polyethylene naphthalate.

Examples of the amide resins include nylon-6 (Ny-6), nylon-6,6, metaxylenediamine-adipic acid polycondensates, polymethyl methacrylamide, and polymetaxylylene adipamide (MXD6-Ny).

Examples of the acrylic resins include polymethyl methacrylate, etc.

Examples of the styrene-based resins include AS resin and ABS resin.

Examples of the hydrophobically modified cellulose include cellulose triacetate and cellulose diacetate.

Examples of the chlorine-containing resins include polyvinyl chloride and polyvinylidene chloride.

Examples of the fluorine-containing resins include polyvinyl fluoride, polyvinylidene fluoride, polytetrafluoroethylene, ethylene-tetrafluoroethylene copolymers, and tetrafluoroethylene-perfluoroalkyl vinyl ether copolymers.

Examples of the hydrogen bonding resins include polyvinyl alcohol, ethylene-vinyl alcohol copolymers (EVOH), and cellulose derivatives; among these, polymers whose weight fraction of hydroxyl groups per unit weight of resin is a proportion of 20 to 60% are preferred.

Examples of the thermosetting resins include phenol resins, melamine resins, urea resins, ethyleneimine resins, and a resin resulting from thermal reaction of the thermally reactive composition described above.

Examples of the photocurable resins include epoxy resins and acrylic resins.

In the case where the adjacent layer of the multilayer structure of the present invention is made of resin, the adjacent layer may be unstretched, uniaxially stretched, or biaxially stretched.

The adjacent layer, the inorganic film, and the below-described additional layer may be subjected to surface treatment such as corona treatment, ozone treatment, electron beam treatment, ion treatment, flame treatment using silane gas or the like, normal pressure or reduced pressure plasma treatment prior to its lamination with another layer. The inorganic film and the below-described additional layer may be subjected to the above-described surface treatment.

When the material that constitutes the adjacent layer of the multilayer structure of the present invention is resin, the resin contained in the adjacent layer and the resin contained in the inorganic film may be the same resin or alternatively may be different resins.

The multilayer structure of the present invention may have an additional layer other than the inorganic film and the adjacent layer. There may be a plurality of additional layers. The additional layer may be made of the same material as the material used for the adjacent layer and also may be made of a material different from both the inorganic film and the adjacent layer. Examples of the configuration taken in the case where the multilayer structure of the present invention has an additional layer include:

adjacent layer/inorganic film/adjacent layer/additional layer A (configuration 1), adjacent layer/inorganic film/adjacent layer/additional layer B/additional layer C (configuration 2), additional layer D/adjacent layer/inorganic film (configuration 3), and additional layer E/adjacent layer/inorganic film/adjacent layer/additional layer F (configuration 4).

The multilayer structure of the present invention may have a plurality of inorganic films. Examples of the configuration taken in the case where the multilayer structure of the present invention has a plurality of inorganic films include:

adjacent layer/inorganic film/adjacent layer/inorganic film (configuration 5), and adjacent layer/inorganic film/adjacent layer/inorganic film/adjacent layer (configuration 6).

Examples of the multilayer structure of the present invention include:

a method in which a coating film is formed on the surface of a structure including an adjacent layer as a surface layer using a mixed slip composed of an inorganic laminar compound, a resin and a liquid medium and then the liquid medium is removed from the coating film, a method in which a coating film is formed on the surface of a substrate using the mixed slip and then the liquid medium is removed from the coating film, thereby producing a multilayer structure composed of the substrate and an inorganic film, and then the substrate is removed and subsequently an adjacent layer is formed on at least one surface of the inorganic film, and a method of laminating an inorganic film and an adjacent layer produced beforehand.

It is preferred from a heat resistance standpoint that the multilayer structure of the present invention has an adjacent layer containing a resin resulting from reaction of the above-described thermally reactive composition.

Preferably, the inorganic film and the multilayer structure of the present invention are subjected to heating treatment in order to improve water resistance and gas barrier properties.

The heating treatment is preferably carried out at a temperature higher than the temperature at which the liquid medium is removed from the above-mentioned coating film. The temperature at which the heating treatment is carried out is preferably 100 to 400° C., more preferably 120 to 350° C., even more preferably 130 to 350° C. Preferably, the heating treatment is carried out in an atmosphere with a water vapor concentration of less than 50 $g/m^3$. The time during which the heating treatment is carried out is usually 1 second to 24 hours. As to the heat source to be used for the heating treatment, the heat source to be used for removing a liquid medium from a coating film can be applied.

When the inorganic film or the adjacent layer of the present invention contains a resin containing a hydroxyl group and a carboxyl group, it is preferred to perform moist heat treatment after the heating treatment. The moist heat treatment is treatment of holding in an atmosphere with a temperature of 100° C. or more and a water vapor concentration of higher than 290 $g/m^3$ or in water at 80° C. or more. The time during which the moist heat treatment is carried out is usually 1 second to 1 hour. In the case of treatment in an atmosphere with a temperature of 100° C. or more and a water vapor concentration of higher more than 290 $g/m^3$, the temperature is preferably within the range of 120 to 200° C. and the water vapor concentration is preferably within the range of 500 to 20000 $g/m^3$. In the case of treatment of holding in water at 80° C. or more, the temperature of the water is preferably 100° C. or more, more preferably within the range of 120 to 200° C.

The inorganic film of the present invention and the layers constituting the multilayer structure of the present invention are not particularly limited in thickness. When the inorganic film of the present invention and the multilayer structure of the present invention are used as a gas barrier material, the thickness of the inorganic film is usually 1 μm to 50 μm. The above-described adjacent layer and the additional layer are usually 0.01 μm to 50 μm in thickness.

The respective layers constituting the multilayer structure of the present invention may, as needed, contain additives such as a UV absorber, a colorant and an antioxidant.

The inorganic film and the multilayer structure of the present invention can be used for tires, screws, optical components such as substrates or encapsulants for flexible displays such as liquid crystal displays and organic EL, and electronic components such as substrates or encapsulants for solar cells or dye sensitizing solar cells, vacuum insulated material panels, and so on.

When the inorganic film and the multilayer structure are used, for example, as a substrate for a display, they can better meet demands such as weight reduction or increase in size, and are more flexible in shape and more capable of performing curved display as compared with glass substrates which are heavy, prone to fracture, and difficult to increase in size. Moreover, they are advantageous also in cost reduction they are higher in production efficiency than glass due to their capability of applying the roll-to-roll system. Furthermore, they are higher in gas barrier properties for water vapor or air as compared with conventional substrates using plastics or the like and therefore they can solve problems, for example, that the liquid crystal contained in liquid crystal cells is degraded to form display defects and deteriorates display quality.

In use for the substrate application for a silicon type or dye sensitizing type solar cell, if the inorganic film and the multilayer structure of the present invention are used as a backsheet or a front panel, they can inhibit deterioration in photoelectric conversion properties caused by the action of gas, such as water vapor or oxygen, on an electrode, a semiconductor, a dye, or an electrolyte. Moreover, they can be used suitably in forming a silicon layer or the like with a thin film because they are excellent also in heat resistance. In use as an electronic component, they can be used suitably also in the case of being used for a printed wiring board application because they are excellent in heat resistance and also excellent in alkali resistance and acid resistance in etching.

In use for an exterior component in a vacuum insulated material panel application, the internal vacuum degree can be maintained for a long term because of excellent gas barrier properties and it is excellent in heat insulation properties because it is less prone to cause heat bridging as compared with aluminum foil, etc.

Use of the inorganic film and the multilayer structure of the present invention as a packaging material can prevent the oxygen-induced or water vapor-induced degradation of the contents packed in the packaging material. When the multilayer structure is used as a packaging material, examples of the application thereof include film, bag, pouch, bottle, bottle cap, carton container, cup, pan, tray, tank, and tube. Examples of the contents which are packed in the inorganic film and the multilayer structure of the present invention include foods such as Western-style confectioneries such as cakes and "castella", Japanese confectioneries, e.g., Daifuku and rice cake, snack foods such as potato chips, seafood products such as "chikuwa" and "kamaboko", miso, pickles, konnyaku, meatballs, hamburger steaks and sausages, beverages such as coffee, tea and juice, dairy products such as milk and yogurt, boiled rice and curry. The multilayer structure of the present invention may be used for packaging toiletries such as detergents, bath additives and cosmetics; fuels such as gasoline and hydrogen gas; medical drugs and instruments such as epipastics, tablets, eye drops and infusion solution bags; electronic components and devices such as hard disks and silicon wafers.

EXAMPLES

The present invention is described in detail below with reference to examples. The methods of measuring physical properties are described below.

[Thickness Measurement]

Thickness of not less than 0.5 μm was measured by means of a digital thickness measuring device (contact-type thickness measuring device, commercial name: Ultra-High Precision Deci-Micro Head MH-15M, manufactured by Nihon Kogaku K.K.). Thickness of less than 0.5 μm was determined through cross section observation by a transmission electron microscope (TEM).

[Particle Diameter Measurement]

A particle diameter was measured using a laser diffraction/scattering particle size distribution analyzer (LA910 manufactured by Horiba, Ltd.). Each of the coating slips (1) and (2) described below was diluted to 100 times or more with ion exchange water, and the average particle diameter of the inorganic laminar compound in the coating slip was measured with a flow cell at a light path length of 4 mm and the thus-determined average particle diameter was considered as the average particle diameter L of the inorganic laminar compound.

In addition, the average particle diameter of the inorganic laminar compound in the coating slips (1) and (2) was measured with a paste cell at a light path length of 50 μm without diluting the coating slips. When the average particle diameter approximately agreed with the average particle diameter "L" determined with a diluted liquid, the inorganic laminar compound was considered to be fully swollen and cleaved in the dispersion.

[Aspect Ratio Calculation]

The diffraction measurement by the powder method was carried out for an inorganic laminar compound itself by using an X-ray diffractometer (XD-5A, manufactured by Shimadzu Corporation). By the measurement, the unit thickness "a" of the inorganic laminar compound was determined. Moreover, the aspect ratio "Z" was calculated using the unit thickness "a" and the particle diameter "L" determined above, on the basis of the formula $Z=L/a$.

[Heating Treatment]

A multilayer structure sized 210 mm×300 mm was heat treated for 60 minutes in an oven of 150° C. with a water vapor concentration of 5 g/m$^3$.

[Moist Heat Treatment]

Using a compact retorting autoclave (RK-3030, manufactured by ALP Corp.), a multilayer structure sized 210 mm×300 mm was wet heat treated under a water vapor atmosphere at 120° C. for a prescribed period of time. The water vapor concentration was 1113 g/m$^3$.

[Drying Treatment]

A multilayer structure sized 210 mm×300 mm was left at rest for 24 hours under an atmosphere of 23° C. and 50% RH.

[Image Analysis]

For the multilayer structures (1) and (2), a cross section including the thickness direction of a multilayer structure was observed with TEM at a magnification of 500,000, thereby affording cross section observed images (1) and (2). The cross section observed images were subjected to image processing to classify into 256 levels of shade on the gray scale using image processing software (WinROOF). Subsequently, at each of arbitrary eight points of each image-processed observed images, a straight line was drawn parallel with the thickness direction of the multilayer structure from one surface of the inorganic film contained in the multilayer structure to the other surface, and then linear analysis was performed along each of the straight lines. For each of the results of the linear analyses, the standard deviation of degrees relative to the degree of each shade was determined and the average of eight standard deviations was calculated.

[Measurement of Oxygen Transmission Rate]

Based on JIS K7126, the oxygen transmission rate was measured under conditions represented by 23° C. and 90% RH by using an oxygen transmission rate tester (OX-TRAN ML, manufactured by MOCON Inc.).

[Preparation of Coating Slip]

(1) Preparation of Coating Slip (1)

In a dispersion vessel (commercial name: DESPA MH-L, manufactured by ASADA IRON WORKS. CO., LTD.), 1300 g of ion exchange water (specific electric conductance: 0.7 μs/cm or less) and 130 g of polyvinyl alcohol (PVA117H, manufactured by Kuraray Co., Ltd., degree of saponification: 99.6%, degree of polymerization: 1,700) were mixed and heated to 95° C. under low-speed stirring (1500 rpm, peripheral speed: 4.1 m/min). After stirring the mixture at that temperature for 30 minutes to dissolve the polyvinyl alcohol, the mixture was cooled to 60° C. Thus, an aqueous polyvinyl alcohol solution was obtained. While the aqueous polyvinyl alcohol solution (60° C.) was stirred under the above-mentioned conditions, an aqueous alcohol solution prepared by mixing 122 g of 1-butanol, 122 g of isopropyl alcohol and 520 g of ion exchange water was dropped in five minutes. After completion of the dropping, the stirring mode was switched to high-speed stirring (3000 rpm, peripheral speed: 8.2 m/min). To the stirring system was added slowly 82 g of high purity montmorillonite (commercial name: Kunipia G; produced by Kunimine Industries Co., Ltd.; unit thickness=1.22 nm). After the completion of the addition, stirring was continued at 60° C. for 60 minutes. Then, 243 g of isopropanol was further added in 15 minutes and the mixture was subsequently cooled to room temperature. Thus, a clay mineral dispersion (1) was obtained.

To the clay mineral dispersion (1) was added 2.5 g of a nonionic surfactant (polydimethylsiloxane polyoxyethylene copolymer, commercial name: SH3746, produced by Dow Corning Toray Co., Ltd.) under low-speed stirring (1500 rpm, peripheral speed: 4.1 m/min), and then 10 g of a H+ type ion exchange resin (Duolite C255LFH; produced by Nihonsuiken Co., Ltd.) was added so that the pH of the system might become 6, followed by stirring for 30 minutes. Thus, a mixed slip (1) was obtained. Then, the mixed slip (1) was filtered with a filter (with a mesh opening size of 297 μm) to remove the residue of the ion exchange resin. Thus, a clay mineral dispersion (2) having a pH of 6 was prepared.

In another dispersion vessel (commercial name: DESPA MH-L, manufactured by ASADA IRON WORKS. CO., LTD.), 1067 g of ion exchange water (specific electric conductance: 0.7 μs/cm or less) and 33 g of polyacrylic acid (produced by Wako Pure Chemical Industries, Ltd., average molecular weight: 1,000,000) were mixed together and stirred at low speed (1500 rpm, peripheral speed: 4.1 m/min) at normal temperature. Thus, a solution of polymer component (A3) was produced.

A mixed slip was prepared by mixing 2519 g of the clay mineral dispersion (2) and 1100 g of the solution of polymer composition (A3) slowly under low-speed stirring (1500 rpm, peripheral speed: 4.1 m/min). The mixed slip was treated under a pressure condition of 1000 kgf/cm$^2$ using a high pressure dispersing device 1 (commercial name: NANOMIZER NMII-2000AR, manufactured by Yoshida Kikai Co., Ltd.). Thus, a coating slip (1) was obtained. The montmorillonite cleaved in the coating slip (1) had an average particle diameter L of 450 nm. Powder X-ray diffraction afforded a unit thickness a of 1.22 nm and an aspect ratio Z of 370.

(2) Preparation of Coating Slip (2)

A coating slip (2) was obtained in the same way as the preparation of the coating slip (1) except that a high pressure dispersing device 2 (commercial name: Ultrahigh-Pressure Homogenizer M110-E/H, manufactured by Microfluidics Corp.) instead of the high pressure dispersing device 1. The montmorillonite cleaved in the coating slip (2) had an average particle diameter L of 480 nm. The aspect ratio Z was 390.

Example 1

A 15-μm thick biaxially stretched nylon (ONy) film (commercial name: ON-U; produced by Unitika, Ltd.), one surface of which had been corona treated, was used as an adjacent layer. The coating slip (1) was gravure coated to the corona-treated surface of the adjacent layer by a microgravure coating method (the number of gravure lines: #150 (#: GM)) at a coating speed of 3 m/min using a test coater (manufactured by Yasui Seiki Co.), followed by drying at 100° C., so that a multilayer structure (1') having an adjacent layer and an inorganic film was obtained.

The thickness of the inorganic film contained in the multilayer structure (1') was 0.1 μm. The resulting multilayer structure (1') was subjected to heating treatment and then was left at rest under an atmosphere of 23° C. and 50% RH for 24 hours, and it was subsequently subjected to moist heat treatment for 60 minutes, followed by drying treatment, so that a multilayer structure (1) was obtained. The oxygen transmission rate of the multilayer structure (1) was measured. The sodium concentration in the inorganic film was 7000 ppm. In addition, the multilayer structure (1) was subjected to TEM observation and then image analysis was carried out. The results are shown in Table 1.

Comparative Example 1

A multilayer structure (2') having an adjacent layer and an inorganic film was obtained in the same way as Example 1 except that the coating slip (2) was used instead of the coating slip (1). The thickness of the inorganic film contained in the multilayer structure (2') was 0.15 μm. The resulting multilayer structure (2') was subjected to heating treatment and then was left at rest under an atmosphere of 23° C. and 50% RH for 24 hours, and it was subsequently subjected to moist heat treatment for 60 minutes, followed by drying treatment, so that a multilayer structure (2) was obtained. The oxygen transmission rate of the multilayer structure (2) was measured and it was converted into an oxygen transmission rate of the inorganic film per 0.1 μm in thickness according to the following Formula 1. The results are shown in Table 1.

$$P1=P2\times(T1/0.1) \quad \text{(Formula 1)}$$

P1: Oxygen transmission rate (cc/m$^2$·day·atm) of the inorganic film per 0.1 μm in thickness P2: Oxygen transmission rate (measured) of the multilayer structure T1: Thickness (μm) of the inorganic film of the multilayer structure The oxygen transmission rate of the adjacent layer is not taken into consideration because it is significantly higher as compared with the oxygen transmission rate of the inorganic film. The sodium concentration in the inorganic film was 7000 ppm. The multilayer structure (2) was TEM observed and then image analysis was performed. The results are also shown in Table 1.

TABLE 1

|  | Standard deviation | | | | | | | | | Oxygen transmission rate |
| --- | --- | --- | --- | --- | --- | --- | --- | --- | --- | --- |
|  | n = 1 | n = 2 | n = 3 | n = 4 | n = 5 | n = 6 | n = 7 | n = 8 | Average | (cc/m$^2$ · day · atm) |
| Example 1 | 10.1 | 10.2 | 11.8 | 12.1 | 13.7 | 12.9 | 15.6 | 12.9 | 12.4 | 4 |
| Comparative Example 1 | 11.7 | 13.1 | 17.2 | 18.4 | 19.4 | 20.7 | 21.2 | 15.1 | 17.2 | 11 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An inorganic film comprising an inorganic laminar compound and a resin, characterized in that when an image observed with a transmission electron microscope of a cross section of the inorganic film including the thickness direction of the film is subjected to image processing to classify into 256 levels of shade on the gray scale, and subsequently, at each of arbitrary five or more points of the image-processed observed image, a straight line is drawn parallel with the thickness direction of the inorganic film from one surface of the inorganic film to the other surface, and then linear analysis is performed along each of the straight lines, the average value of standard deviations of degrees relative to the degree of each shade determined from the results of the linear analysis is 15 or less, wherein an aspect ratio of the inorganic laminar compound is 100 or more and 3000 or less, the inorganic laminar compound contains at least one type of ion selected from the group consisting of hydrogen ions, ammonium ions, and lithium ions between the layers thereof, and a total concentration of the hydrogen ions, the ammonium ions, and/or the lithium ions in the inorganic laminar compound is 400 μmol/g or more per 1 g of the inorganic laminar compound.

2. The inorganic film according to claim 1, wherein the content of the inorganic laminar compound contained in the inorganic film is 5 to 95% by volume where the total volume of the inorganic laminar compound and the resin contained in the inorganic film is taken as 100% by volume.

3. A multilayer structure comprising the inorganic film according to claim 1, and an adjacent layer that is adjacent to the inorganic film.

* * * * *